United States Patent
Cummings et al.

(10) Patent No.: US 11,492,449 B1
(45) Date of Patent: Nov. 8, 2022

(54) RAPID HYDROSILYLATION CURE COMPOSITION

(71) Applicants: Dow Silicones Corporation, Midland, MI (US); Dow Global Technologies LLC, Midland, MI (US)

(72) Inventors: Michelle Cummings, Midland, MI (US); Joel P. McDonald, Midland, MI (US); Jason D. Suhr, Coleman, MI (US); Bradley W. Tuft, Midland, MI (US); Brian Clark, Midland, MI (US); Rachel Rademacher, Auburn, MI (US)

(73) Assignees: Dow Silicones Corporation, Midland, MI (US); Dow Global Technologies LLC, Midland, MI (US)

( * ) Notice: Subject to any disclaimer, the term of this patent is extended or adjusted under 35 U.S.C. 154(b) by 0 days.

(21) Appl. No.: 17/761,269

(22) PCT Filed: Dec. 2, 2020

(86) PCT No.: PCT/US2020/062788
§ 371 (c)(1),
(2) Date: Mar. 17, 2022

(87) PCT Pub. No.: WO2021/118837
PCT Pub. Date: Jun. 17, 2021

Related U.S. Application Data

(60) Provisional application No. 62/946,449, filed on Dec. 11, 2019.

(51) Int. Cl.
| | |
|---|---|
| C08G 77/20 | (2006.01) |
| C08G 77/12 | (2006.01) |
| C08G 77/06 | (2006.01) |
| B29C 35/02 | (2006.01) |
| B29K 83/00 | (2006.01) |
| C08G 77/00 | (2006.01) |

(52) U.S. Cl.
CPC .............. *C08G 77/20* (2013.01); *B29C 35/02* (2013.01); *C08G 77/06* (2013.01); *C08G 77/12* (2013.01); *B29K 2083/00* (2013.01); *C08G 77/70* (2013.01); *C08G 77/80* (2013.01)

(58) Field of Classification Search
CPC .......... C08G 77/12; C08G 77/20; C08L 83/04
See application file for complete search history.

(56) References Cited

U.S. PATENT DOCUMENTS

| | | | |
|---|---|---|---|
| 2,676,182 | A | 4/1954 | Daudt et al. |
| 3,159,601 | A | 12/1964 | Ashby |
| 3,220,972 | A | 11/1965 | Lamoreaux |
| 3,296,291 | A | 1/1967 | Chalk et al. |
| 3,419,593 | A | 12/1968 | Willing |
| 3,516,946 | A | 6/1970 | Modic |
| 3,722,247 | A | 3/1973 | Rouyer |
| 3,814,730 | A | 6/1974 | Karstedt |
| 3,989,668 | A | 11/1976 | Lee et al. |
| 4,766,176 | A | 8/1988 | Lee et al. |
| 4,774,310 | A | 9/1988 | Butler |
| 4,784,879 | A | 11/1988 | Lee et al. |
| 5,017,654 | A | 5/1991 | Togashi et al. |
| 5,036,117 | A | 7/1991 | Chung et al. |
| 5,175,325 | A | 12/1992 | Brown et al. |
| 9,512,273 | B2 | 12/2016 | Tajima et al. |
| 2015/0274929 | A1 | 10/2015 | Brick et al. |

FOREIGN PATENT DOCUMENTS

| | | |
|---|---|---|
| EP | 347895 | 11/1993 |
| EP | 3517576 | 7/2019 |
| WO | 2012002561 | 1/2012 |
| WO | 2014021469 | 2/2014 |
| WO | 2016022332 | 2/2016 |
| WO | 2017087351 | * 5/2017 |
| WO | 2017143508 | 8/2017 |
| WO | 2017143961 | 8/2017 |
| WO | 2017144461 | 8/2017 |
| WO | 2017147061 | 8/2017 |
| WO | 2018155131 | 8/2018 |

OTHER PUBLICATIONS

The Analytical Chemistry of Silicones, Smith, A. Lee, ed., John Wiley & Sons: New York, 1991, p. 347ff.

* cited by examiner

*Primary Examiner* — Kuo Liang Peng
(74) *Attorney, Agent, or Firm* — Steven W. Mork

(57) ABSTRACT

A composition contains a blend of linear and resinous alkenyl functionalized polyorganosiloxanes, a blend of linear and resinous silyl hydride functionalized polyorganosiloxanes, and a hydrosilylation catalyst where the linear silyl hydride functionalized polyorganosiloxanes has a ratio of $D/D^H$ that is greater than 2.0 and less than 14, the molar and the ratio of silyl hydride hydrogens to the sum of terminal alkenyl functionality on the alkenyl functionalized polyorganosiloxane is 1.2-2.2.

10 Claims, 1 Drawing Sheet

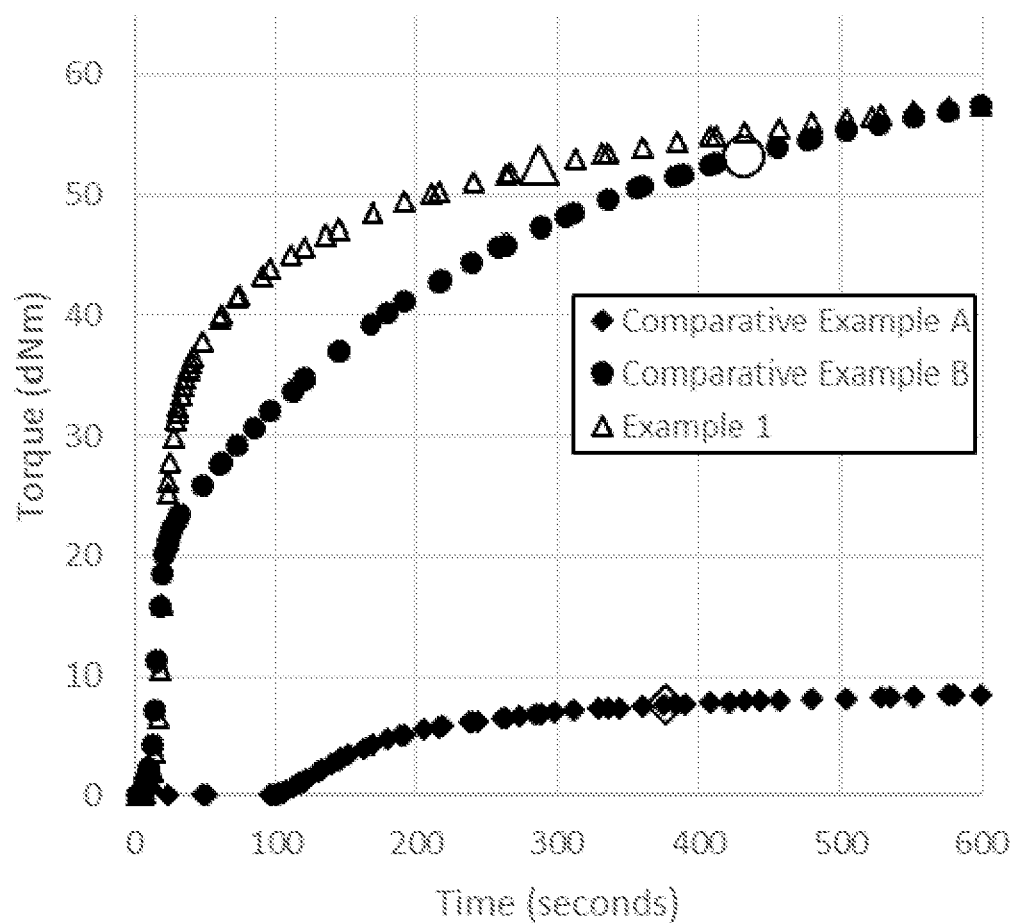

RAPID HYDROSILYLATION CURE COMPOSITION

BACKGROUND OF THE INVENTION

Field of the Invention

The present invention relates to a composition of polyorganosiloxanes.

INTRODUCTION

Hydrosilylation reaction compositions undergo hydrosilylation reactions to form cured compositions. Hydrosilylation reaction composition are commonly used in many different applications including in forming coatings and molded parts. In many of these applications there is benefit to rapidly curing the composition. For example, reactive injection molding applications can utilize hydrosilylation reaction compositions to form molded parts in a semi-continuous process where a rapid curing of the composition in the mold can speed up the entire process. Reactive injection molding processes require introducing reactants into a mold where the reactants crosslink to form a polymeric article in the shape of the mold, followed by removal of the crosslinked polymeric article from the mold and then injecting the mold with new reactants to form another crosslinked polymeric article. For reactive injection molding processes, speed of the crosslinking reaction in the mold is important because it dictates the required residence time of a part in the mold, which typically dictates the rate of manufacture. Residence times for a part in a mold during hydrosilylation reactive injection molding process typically are up to five minutes. It is desirable to identify how to speed the hydrosilylation reaction for reactions used in reactive injection molding in order to minimize the residence time in a mold during cure.

One way to decrease residence time in the mold during reactive injection molding of the hydrosilylation reaction composition is to remove the molded article before the hydrosilylation reaction is complete. However, if the process removes molded articles before they are sufficiently reacted there can be dimensional inconsistencies and/or mechanical property variations from part to part. Compositions that are reacting (curing) free of mold constraints can expand or contract as the reaction proceeds. Additionally, incompletely cured parts subjected to mechanical stresses result in undesirable deformation as crosslinking continues outside the mold. Therefore, it is desirable to decrease mold residence time by decreasing the time needed to cure sufficiently to maintain dimensional integrity and consistent mechanical properties once removed from the mold. In particular, it is desirable to minimize "T90"—the time needed to achieve 90% of the cured composition's strength relative to the composition strength of a 10 minute cure (twice the highest typical residence time in a mold). After 10 minutes of cure time the composition usually has achieved near constant strength. At 90% of that strength the composition should have sufficient dimensional integrity and mechanical property consistency to remove from a mold.

One option for minimizing T90 is by increasing the concentration of reaction catalyst in the composition. Typical hydrosilylation reaction compositions used in reactive injection molding comprise either a linear or a resinous silyl hydride functionalized crosslinker in combination with a linear and/or resinous alkenyl functionalized polyorganosiloxane and a hydrosilylation reaction catalyst. Hydrosilylation reactions occur between vinyl functionalized reactants and crosslinkers containing multiple Si—H functionalities and utilize a hydrosilylation reaction catalyst (typically, a platinum catalyst). Increasing the concentration of hydrosilylation catalyst can increase the rate of reaction. However, increased catalyst concentration also tends to increase the yellowing in the resulting molded article, which is undesirable for clear and colorless optical articles.

Another option for reducing T90 is to increase the concentration of SiH functionality relative to vinyl functionality (that is, increase the concentration of crosslinker functionality). However, increasing the amount of crosslinker to increase SiH functionality results in a reduction in article clarity, which is also undesirable for clear and colorless optical articles.

It is desirable to reduce T90 for a hydrosilylation reaction composition without increasing the concentration of catalyst or increasing the concentration of crosslinker functionalities relative to alkenyl functionalities in the composition. It is further desirable to achieve such a reduction of T90 while maintaining or increasing the strength of the resulting cured composition after 10 minutes of curing.

BRIEF SUMMARY OF THE INVENTION

The composition of the present invention solves the problem of reducing T90 for a hydrosilylation reaction without increasing the concentration of catalyst or increasing the concentration of crosslinker functionalities relative to alkenyl functionalities in the composition. Moreover, the present invention solves the problem of reducing the T90 while maintaining or increasing the strength of the resulting cured composition after 10 minutes of curing. Even more, the present invention is capable of solving this problem for compositions where the molar ratio of SiH to alkenyl functionality ranging from 1.2 or more to 1.6 or less, even 1.7 or less and even 2.2 or less, which makes the invention applicable to compositions suitable for a range of target final cured strengths.

Herein, "strength" of a cured composition is measured by torque-modulus, where a higher torque-modulus corresponds to a higher strength. Measure torque-modulus according to ASTM D5289 at 150 degrees Celsius (° C.) for a 10 minute reaction period. Hence, herein, determine T90 from a plot of the strength (torque-modulus) of a composition as it cures at 150 degrees Celsius (° C.) for a period of 10 minutes. T90 is the time at which the composition reaches 90% of the strength the composition has at 10 minutes. In particular, measure torque-modulus using a moving die rheometer (MDR) (Alpha Technologies MDR-2000). Place a 50 micrometer thick Mylar™ polyester film on a weighing tray on a digital scale (Mylar™ is a trademark of DUPONT Teijin Films US). Weigh approximately 4 grams of a formulation promptly after mixing all of the components together onto the Mylar polyester film. Cover the formulation on the Mylar polyester film with an additional layer of 50 micrometer thick Mylar polyester film and transfer immediately to MDR platens that are at a steady state of 150° C. for testing. Close the platens and oscillate the bottom platen in a 1° arc throughout the test. Monitor the torque-modulus for 10 minutes at 150° C. to obtain a plot of the torque-modulus for a sample.

The present invention offers these improvements over typical commonly used hydrosilylation reaction compositions comprising a blend of linear and resinous alkenyl functional polyorganosiloxanes in combination with either a linear or resinous silyl hydride functional polyorganosiloxane. Surprisingly, the present invention is a result of discovering that using a blend of linear and resinous alkenyl functional polyorganosiloxanes in combination with a blend of resinous silyl hydride functional polyorganosiloxane and a linear silyl hydride functional polyorganosiloxane having a particular ratio of D and $D^H$ units (defined below) results in a shorter T90 for the composition and equal or greater strength of the fully cured composition than compositions comprising only resinous or only polymeric silyl hydride functional polyorganosiloxanes, or even using blends of linear and resinous silyl hydride functional polyorganosiloxanes having a molar ratio of D and $D^H$ units outside the particular ratio range. The comparison is at equal silyl hydride (SiH) group to alkenyl group mole-ratios in the composition and at equal catalyst concentrations. Use of a linear silyl hydride functional polyorganosiloxane to both increase reaction rate and maintain or increase strength of a fully cured composition is especially surprising because introducing or increasing the concentration of linear polyorganosiloxanes typically would be expected to reduce strength of a cured composition and even slow the curing rate. However, in the particular range of $D/D^H$ molar ratio of the presently claimed invention, the linear polyorganosiloxane increases the rate of cure to 90% of the composition's 10 minute strength (decreases T90) while either maintaining or increasing the 10 minute strength of the cured composition.

The compositions of the present invention also can produce a clear and colorless cured composition in addition to decreasing T90 and at least maintaining the strength of the fully cured composition.

The key to the present invention is in the use of a blend of linear and resinous silyl hydride functional polyorganosiloxanes where the linear silyl hydride has a particular $D/D^H$ molar ratio. The blend comprises, or consists of, a resinous silyl hydride functional polyorganosiloxane in combination with a linear silyl hydride functional polyorganosiloxane comprising primarily D units having the formula ($R'_2SiO_{2/2}$) and $D^H$ units having the formula ($R''HSiO_{2/2}$), where R' is independently in each occurrence selected from a group consisting of phenyl and $C_{1-8}$ alkyl groups while R" is independently in each occurrence selected from a group consisting of hydrogen and $C_{1-8}$ alkyl groups, and wherein the molar ratio of $D/D^H$ units is greater than 2.0, preferably 2.2 or more and at the same time less than 14.0, typically 13.5 or less, 11 or less, 10 or less, 9 or less, even 8 or less.

In a first aspect, the present invention is a composition comprising: (A) a blend of alkenyl functionalized polyorganosiloxanes, the blend consisting of: (i) a linear alkenyl functionalized polyorganosiloxane having the following formula:

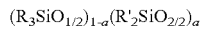

$$(R_3SiO_{1/2})_{1-a}(R'_2SiO_{2/2})_a$$

where: at least one R in each ($R_3SiO_{1/2}$) unit is selected from $C_{1-8}$ terminal alkenyl groups; subscript a has a value in a range of 0.333 to 0.999; and wherein the linear alkenyl functionalized polyorganosiloxane has a weight-average molecular weight of 260-155,000 Daltons as determined by gel permeation chromatography (GPC); and (ii) a resinous alkenyl functionalized polyorganosiloxane having the following formula:

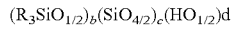

$$(R_3SiO_{1/2})_b(SiO_{4/2})_c(HO_{1/2})_d$$

where: at least two R groups in each molecule are selected from $C_{1-8}$ terminal alkenyl groups; subscript b has a value in a range of 0.35-0.55; subscript c has a value in a range of 0.46-0.55; subscript d has a value in a range of 0.04 to 0.11; where the sum of subscripts b, c and d is one; the weight-average molecular weight of the resinous alkenyl functionalized polyorganosiloxane is in a range of 3,000 to 30,000 Daltons as determined by GPC; where the total concentration of $C_{1-8}$ terminal alkenyl groups in the blend of alkenyl functionalized polyorganosiloxanes is in a range of 2.5 to 13.5 mole-percent relative to total moles of polyorganosiloxanes in the blend of alkenyl functionalized polyorganosiloxanes; and (B) a blend of silyl hydride functionalized polyorganosiloxanes, the blend consisting of: (i) a linear silyl hydride functionalized polyorganosiloxane having the following formula:

$$(R'_3SiO_{1/2})_{1-(e+f)}(R'_2SiO_{2/2})_e(R''HSiO_{2/2})_f$$

where: the sum of subscripts e and f is in a range of 0.50 to 0.999; the ratio of subscripts e/f is greater than 2.0 and less than 14.0; wherein the linear silyl hydride functionalized polyorganosiloxane has a silicon hydride concentration in a range of 6 to 45 mole-percent relative to moles of the linear silyl hydride functionalized polyorganosiloxane; and a weight-average molecular weight in a range of 350 to 60,000 Daltons as determined by GPC, and is present at a concentration of more than 10 weight-percent and less than 50 weight-percent of weight of the blend of silyl hydride functionalized polyorganosiloxanes; and (ii) a resinous silyl hydride functionalized polyorganosiloxane having the following formula:

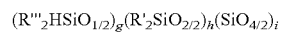

$$(R'''_2HSiO_{1/2})_g(R'_2SiO_{2/2})_h(SiO_{4/2})_i$$

where: subscript g has a value in a range of 0.5 to 0.7; subscript h has a value in a range of 0.01 to 0.03; subscript i has a value in a range of 0.27 to 0.51 where the sum of subscripts g, h and i is one; wherein the resinous silyl hydride functionalized polyorganosiloxane has a silicon hydride concentration in a range of 50 to 75 mole-percent relative to moles of resinous silyl hydride functionalized polyorganosiloxane; and having a weight-average molecular weight in a range of 500 to 1,500 Daltons as determined by GPC; and (C) a hydrosilylation catalyst at a concentration of 2 to 6 weight-parts per million weight parts of the composition; wherein: R is independently in each occurrence selected from a group consisting of phenyl, hydroxyl, $C_{1-8}$ alkyl, and $C_{1-8}$ terminal alkenyl groups; R' is independently in each occurrence selected from a group consisting of phenyl and $C_{1-8}$ alkyl groups; R" and R'" independently in each occurrence selected from a group consisting of hydrogen and $C_{1-8}$ alkyl groups; subscripts a-i are mole-ratios for the corresponding siloxane units relative to total siloxane units in the molecule; and the concentration of Component (A)(i) is in a range of 25 to 80 weight-percent; Component (A)(ii) is in a range of 25 to 70 weight-percent; Component (B)(i) is in a range of 0.2 to 15 weight-percent; and Component (B)(ii) is in a range of 1.0 to 10 weight-percent; with weight-percent relative to combined weight of Components (A)(i), (A)(ii), (B)(i) and (B)(ii); and the molar ratio of silyl hydride hydrogens to the sum of terminal alkenyl functionality on alkenyl functionalized polyorganosiloxane in the composition is in a range of 1.2 to 2.2.

In a second aspect, the present invention is a method for curing the composition of the first aspect, the method comprising the steps of: (i) providing the composition of the first aspect; and (ii) heating the composition to a temperature in a range of 120 to 220° C.

The present invention is useful for preparing cured hydrosilylation products. The present invention is particularly useful for preparing cured hydrosilylation products using an injection molding process.

BRIEF DESCRIPTION OF THE DRAWINGS

FIG. 1 illustrates the rate of cure curves over a 10 minute cure at 150° C. for compositions comprising: only linear crosslinker (Comparative Example A); only resinous crosslinker (Comparative Example B); and the combination of resinous and linear crosslinker of the present invention (Example 1). The rate of cure is shown as a plot of torque-modulus (composition strength) versus time.

DETAILED DESCRIPTION OF THE INVENTION

Test methods refer to the most recent test method as of the priority date of this document when a date is not indicated with the test method number. References to test methods contain both a reference to the testing society and the test method number. The following test method abbreviations and identifiers apply herein: ASTM refers to ASTM International; EN refers to European Norm; DIN refers to Deutsches Institut für Normung; ISO refers to International Organization for Standards; and CIE refers to International Commission on Illumination standards.

Materials identified only by a product name or tradename refer to the material sold under that product name or tradename at the priority filing date of this document unless otherwise stated herein.

"Multiple" means two or more. "And/or" means "and, or as an alternative". All ranges include endpoints unless otherwise indicated.

"Alkyl" is a hydrocarbon radical derived from an alkane by removal of a hydrogen atom. "Substituted alkyl" is an alkyl that has an atom other than carbon and hydrogen in place of at least one carbon or hydrogen. Substituted alkyls include alkyl amines and alkyl thiols.

"Aryl" is a radical derived from an aromatic hydrocarbon by removal of a hydrogen atom. "Substituted aryl" is an aryl that has an atom other than carbon and hydrogen in place of at least one carbon or hydrogen.

"Terminal alkenyl group" refers to an alkenyl group that has a carbon-carbon double bond between a terminal carbon and an adjacent carbon at the end of a carbon chain remote from where the hydrogen atom would have been removed to form the alkenyl group from a corresponding alkene group. For example, allyl groups are terminal alkenyl groups. For avoidance of doubt, vinyl groups are also considered terminal alkenyl groups.

"$C_{x-y}$" refers to molecules having x or more and y or fewer carbon atoms.

"Clear" means a material that has more than 80% average transmittance at a wavelength of 400 nanometers using a 3.2 centimeter sample path length as measured according to ASTM D1003 using an ultraviolet-visible (UV-Vis) spectrometer with an integrating sphere.

"Colorless" means a material has less than 0.007 Δu'v' at 3.2 centimeter path length as determined by the CIE 1976 standard.

Polysiloxanes comprise multiple siloxane units. Polyorganosiloxanes comprise multiple siloxane units wherein one or more siloxane unit includes an organic functionality. Siloxane units are characterized generally by the designation M, D, T and Q. M generally refers to a siloxane unit having the formula "$R°_3SiO_{1/2}$". D generally refers to a siloxane unit having the formula $R°_2SiO_{2/2}$". T generally refers to a siloxane unit having the formula $R°SiO_{3/2}$". Q refers to a siloxane unit having the formula "$SiO_{4/2}$". R° is usually independently in each occurrence selected from a group consisting of hydrogen, hydroxyl, alkoxy, or any carbon-bound substituent, including methyl, ethyl, propyl, butyl, pentyl, hexyl and phenyl. A "carbon-bound substituent" is a group that is bound to the silicon atom through a carbon atom. Notably, an oxygen atom having a multiple of "1/2" subscript indicates that the oxygen bridges the specified atom to a second atom where the second atom is also specified with an oxygen having a multiple of "1/2" subscript. For example, "$(SiO_{4/2})(HO_{1/2})$" refers to a Q-type group with a silicon atom bound through a single oxygen to a hydrogen.

Determine average molar amounts and average mole-ratios of siloxane units and ($HO_{1/2}$) units using $^{29}Si$, $^{13}C$ and $^1H$ NMR using, for example, the method described in *The Analytical Chemistry of Silicones*, Smith, A. Lee, ed., John Wiley & Sons: New York, 1991, p. 347ff. These values are typically stated as subscripts after the associated siloxane unit.

Identity of organic groups on a polyorganosiloxane can be done using Silicon 29 Nuclear Magnetic Spectroscopy ($^{29}Si$ NMR), Carbon 13 Nuclear Magnetic Spectroscopy ($^{13}C$ NMR), proton Nuclear Magnetic Spectroscopy (1H NMR), titration, or Fourier Transform Infrared Spectroscopy (FTIR).

Molecular weight for polysiloxanes are reported herein as weight-average molecular weight as determined by triple detection gel permeation chromatography (GPC) using a Waters 515 pump, a Waters 717 autosampler and Waters 2410 differential refractometer. Conduct separation with two (300 millimeter (mm) by 7.5 mm) Polymer Laboratories PLgel 5 micrometer (μm) Mixed-C columns (molecular weight separation range of 200 to 2,000,000 Daltons), preceded by a PLgel 5 m guard column (50 mm by 7.5 mm). Conduct analysis using HPLC grade toluene flowing at 1.0 milliliter (mL) per minute as the eluent, with the columns and detector at 45° C. Prepare the samples in toluene at 5 milligrams per mL concentration, solvate at room temperature for about three hours with occasional shaking, and filter through 0.45 micrometers (μm) polytetrafluoroethylene syringe filters prior to analysis. Use an injection volume of 75 microliters and collect data for 25 minutes. Perform data collection and analysis using ThermoLabsystems Atlas chromatography software and Polymer Laboratories Cirrus GPC software. Determine weight-average molecular weight relative to a calibration curve ($3^{rd}$ order) using polystyrene standards over the molecular weight range of 580 to 2,300, 00 Daltons.

Determine weight-percent (wt %) of the components in the composition from how much of each component is used to prepare the composition.

Determine T90 for a composition as described previously above. "T90" is the time it takes for the composition to reach 90% of the torque-modulus is has after 10 minutes at 150° C. Measure torque-modulus according to ASTM D5289 at 150 degrees Celsius (° C.) for a 10 minute reaction period.

The present invention is a composition comprising: (A) a blend of alkenyl functionalized polyorganosiloxanes comprising: (i) a linear alkenyl functionalized polyorganosiloxane and (ii) a resinous alkenyl functionalized polyorganosiloxane; (B) a blend of silyl hydride functionalized polyorganosiloxanes comprising: (i) a linear silyl hydride functionalized polyorganosiloxane; and (ii) a resinous silyl hydride functionalized polyorganosiloxane; and (C) a hydrosilylation catalyst.

Component (A)—Blend of Alkenyl Functionalized Polyorganosiloxanes

The blend of alkenyl functionalized polyorganosiloxanes consists of: (i) a linear alkenyl functionalized polyorganosiloxane; and (ii) a resinous alkenyl functionalized polyorganosiloxane. The structures for each of these alkenyl functionalized polyorganosiloxanes are described below.

Selection of R groups in the linear and resinous alkenyl functionalized polyorganosiloxanes is such that total concentration of $C_{1-8}$ terminal alkenyl groups provided by R groups is in a range of 2.5 to 13.5 mole-percent (mol %) relative to total moles of polyorganosiloxanes in the blend of alkenyl functionalized polyorganosiloxanes (combination of (A)(i) and (A)(ii)).

(A)(i) Linear Alkenyl Functionalize Polyorganosiloxane

The linear alkenyl functionalized polyorganosiloxane is required in the present invention primarily as a reactive viscosity reducing agent for the composition. Without the linear alkenyl functionalized polyorganosiloxane, the composition viscosity is thick and unusable in injection molding processes. Reactivity in the viscosity reducing agent is important to bind the component into the resulting polymer thereby precluding it from being an extractable in the cured form of the composition.

The linear alkenyl functionalized polyorganosiloxane has the following formula:

$$(R_3SiO_{1/2})_{1-a}(R'_2SiO_{2/2})_a$$

R is independently in each occurrence selected from a group consisting of phenyl, hydroxyl, $C_{1-8}$ alkyl, alkoxy, and $C_{1-8}$ terminal alkenyl groups; provided that at least one R in each $(R_3SiO_{1/2})$ unit is a $C_{1-8}$ terminal alkenyl group. Preferably, the $C_{1-8}$ terminal alkenyl group is selected from a group consisting of vinyl, propenyl, butenyl, pentenyl and hexenyl. Desirably, the $C_{1-8}$ terminal alkenyl group is a vinyl group.

R' is independently in each occurrence selected from a group consisting of phenyl, $C_{1-8}$ alkyl and alkoxy, groups. Preferably, the $C_{1-8}$ alkyl groups are selected from a group consisting of methyl, ethyl, propyl, butyl, pentyl and hexyl.

Subscript a is the average mole-ratio of the $(R'_2SiO_{2/2})$ siloxane units relative to all siloxane units in the molecule and has a value of 0.333 or higher, preferably 0.8 or higher while at the same time has a value of 0.999 or lower.

The linear alkenyl functionalized polyorganosiloxane has a weight-averaged molecular weight of 260 Daltons (Da) or more, 300 Da or more, 400 Da or more, 500 Da or more, 1,000 Da or more, 2,000 Da or more, 3,000 Da or more, 4,000 Da or more, 5,000 Da or more, 7,500 Da or more, 10,000 Da or more, 15,000 Da or more, 20,000 Da or more, 25,000 Da or more, even 28,000 Da or more while at the same time has a weight-averaged molecular weight of 155,000 Da or less, preferably 140,000 Da or less, even 130,000 Da or less.

Suitable linear alkenyl functionalized polyorganosiloxanes include any one or combination of more than one of those commercially available from Gelest under the names DMS-V03 through DMS-V52.

The concentration of the linear alkenyl functionalized polyorganosiloxane (Component (A)(i)) is 25 weight-percent (wt %) or more while at the same time 80 wt % or less based on the weight of the sum of Components (A)(i), (A)(ii), (B)(i) and (B)(iii).

(A)(ii) Resinous Alkenyl Functionalized Polyorganosiloxane

The resinous alkenyl functionalized polyorganosiloxane is required in the present invention as a reactive reinforcing agent. Without the resinous alkenyl functionalized polyorganosiloxane, the composition would not cure to a desired strength or toughness for extracting from a mold during a reactive injection molding process.

The resinous alkenyl functionalized polyorganosiloxane has the following formula:

$$(R_3SiO_{1/2})_b(SiO_{4/2})_c(HO_{1/2})_d$$

R is independently in each occurrence selected from a group consisting of phenyl, hydroxyl, $C_{1-8}$ alkyl, alkoxy, and $C_{1-8}$ terminal alkenyl groups; provided that R is in at least two occurrences in each molecule selected from a group consisting of $C_{1-8}$ terminal alkenyl groups. Preferably, the $C_{1-8}$ terminal alkenyl group is selected from a group consisting of vinyl, propenyl, butenyl, pentenyl and hexenyl. Desirably, the $C_{1-8}$ terminal alkenyl group is a vinyl.

Subscript b is the average mole-ratio of the $(R_3SiO_{1/2})$ siloxane units in the molecule relative to total moles of $(R_3SiO_{1/2})$, $(SiO_{4/2})$ and $(HO_{1/2})$ units in the molecule. Subscript b has a value in a range of 0.35 to 0.55.

Subscript c is the average mole-ratio of the $(SiO_{4/2})$ siloxane units in the molecule relative to total moles of $(R_3SiO_{1/2})$, $(SiO_{4/2})$ and $(HO_{1/2})$ units in the molecule. Subscript c has a value in a range of 0.46 to 0.55.

Subscript d is the average mole-ratio of $(HO_{1/2})$ units in the molecule relative to total moles of $(R_3SiO_{1/2})$, $(SiO_{4/2})$ and $(HO_{1/2})$ units in the molecule. Subscript c has a value of 0.04 or more, even 0.06 or more and at the same time, 0.11 or less.

The resinous alkenyl functionalized polyorganosiloxane has a weight-average molecular weight in a range of 3,000 to 30,000 Daltons.

Suitable resinous alkenyl functionalized polyorganosiloxanes include those prepared according to U.S. Pat. No. 2,676,182. The resinous alkenyl functionalized polyorganosiloxane can be made by treating a resin copolymer produced by a silica hydrosol capping process with an alkenyl containing endblocking agent. This method preferably includes reacting a silica hydrosol under acidic conditions with a hydrolysable triorganosilane such as trimethylchlorosilane, a siloxanes such as hexamethyldisiloxane, and combinations thereof, and then recovering a copolymer having M-type units and Q-type units including 2-5 wt % hydroxyl groups. The copolymer may be further reacted with an endblocking agents including unsaturated organic groups and an endblocking agent free of aliphatic unsaturation in amounts sufficient to provide 3 to 9 mole-percent (mol %) of unsaturated organofunctional M units in the resin relative to the sum of all siloxane units of the resin. Suitable endblocking agents include silazanes, siloxanes, silanes, and combinations thereof.

The resinous alkenyl functionalized polyorganosiloxane can have such a formulation where subscript b is in a range of 0.35 or more, 0.40 or more, even 0.44 or more and at the same time 0.47 or less, even 0.44 or less. Such a resinous alkenyl functionalized polyorganosiloxane is particularly versatile in the present invention for achieving the reduced T90 while maintaining or increasing final cured modulus over a broad range of silyl hydride to alkenyl molar ratios including from 1.2 to 2.2. Such resins typically further have subscript d in a range of 0.05 or more, 0.06 or more, even 0.07 or more and at the same time 0.11 or less, even 0.09 or less, even 0.08 or less.

Another desirably resinous alkenyl functionalized polyorganosiloxane has such a formulation where subscript b is 0.48 or more, 0.50 or more and at the same time is 0.55 or less, even 0.53 or less, 0.52 or less, 0.51 or less, even 0.50 or less. Such resins typically further have a subscript d in a range of 0.03 or more, 0.04 or more and at the same time 0.11 or less, 0.09 or less, even 0.08 or less.

The concentration of the resinous alkenyl functionalized polyorganosiloxane (Component (A)(ii)) is 25 wt % or more while at the same time is 70 wt % or less based on the weight of the sum of Components (A)(i), (A)(ii), (B)(i) and (B)(iii).

Component (B)—Blend of Silyl-Hydride Functionalized Polyorganosiloxanes

The blend of silyl-hydride functionalized polyorganosiloxanes consists of: (i) a linear silyl-hydride functionalized polyorganosiloxane; and (ii) a resinous silyl-hydride functionalized polyorganosiloxane. The linear silyl-hydride functionalized polyorganosiloxane is present at a concentration of more than 10 wt %, even 15 wt % or more, 20 wt % or more, even 25 wt % or more while at the same time less than 50 wt %, and can be 45 wt % or less, 40 wt % or less, 35 wt % or less, 30 wt % or less or even 25 wt % or less relative to the weight of the blend of silyl-hydride functionalized polyorganosiloxanes. The balance to 100 wt % is the resinous silyl-hydride functionalized polyorganosiloxane. While compositions with blends of silyl-hydride functional polyorganosiloxanes outside of these ranges may selectively achieve a fast T90 value while increasing or maintaining final modulus of the final cured composition, these blend ratios are needed to achieve such performance over silyl hydride-to-alkenyl ratios between 1.2 and 1.6, preferably 1.7, even more preferably 2.2.

The molar ratio of silyl hydride hydrogens in the composition to the sum of terminal alkenyl functionality on alkenyl functionalized polyorganosiloxanes in the composition is 1.2 or more, preferably 1.4 or more while at the same time is 2.2 or less, preferably 1.8 or less, even more preferably 1.7 or less, or 1.6 or less. Determine this molar ratio from the structure and concentration of the components included in the composition. If structure and composition are not known, determine the molar ratio using $^{1}$H, $^{13}$C and $^{29}$Si NMR spectroscopy to identify the molar concentration of the functional groups in the composition.

Desirably, when subscript b of the resinous alkenyl functionalized polyorganosiloxane is in a range of 0.35 to 0.44 and subscript d is in a range of 0.04 to 0.11, then the molar ratio of silyl hydride hydrogens to the sum of terminal alkenyl functionality on alkenyl functionalized polyorganosiloxane in the composition is in a range of 1.2 to 2.2.

Desirably, when subscript b of the resinous alkenyl functionalized polyorganosiloxane is in a range of 0.44 to 0.50 and subscript d is in a range of 0.06 to 0.11, then the molar ratio of silyl hydride hydrogens to the sum of terminal alkenyl functionality on alkenyl functionalized polyorganosiloxane in the composition is in a range of 1.2 to 1.7.

(B)(i) Linear Silyl Hydride Functionalize Polyorganosiloxane

The linear silyl hydride functionalized polyorganosiloxane offers the surprising synergistic behavior with the other components to provide for a surprisingly reduced T90 while maintaining or increasing final strength of the fully cured composition relative to compositions with Component (B)(i) or Component (B)(ii) alone with Component (A)—compared using compositions having equal SiH:terminal alkenyl group molar ratios.

The linear silyl hydride functionalized polyorganosiloxane has the following formula:

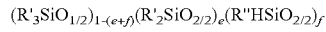

R' is independently in each occurrence selected from a group consisting of phenyl, alkoxy and $C_{1-8}$ alkyl groups.

R" is independently in each occurrence selected from a group consisting of hydrogen and $C_{1-8}$ alkyl groups, and is preferably hydrogen or methyl, most preferably methyl.

Subscript e is the average mole-ratio of the $(R'_2SiO_{2/2})$ siloxane unit ("D") relative to total siloxane units in the linear silyl hydride functionalized polyorganosiloxane. Subscript f is the average mole-ratio of the $(R''HSiO_{2/2})$ siloxane unit ("$D^H$") relative to the total number of siloxane units in the linear silyl hydride functionalized polyorganosiloxane. Subscripts e and f each have a value of 0.50 or more while at the same time 0.999 or less. It has been surprisingly discovered that in order to optimally reduce T90 without increasing the amount of platinum catalyst or the concentration of crosslinkers the ratio of subscripts e:f must be 2.0 or more, preferably 2.2 or more, 2.4 or more 2.6 or more, 3.0 or more, even 4.0 or more while at the same time is 14.0 or less, and can be 13.5 or less, 13.1 or less, 13.0 or less, 12.0 or less, 11.0 or less, 10.5 or less, 10.6 or less, even 5.0 or less, or 3.2 or less. It is possible that this ratio range provides an optimal spacing between D and $D^H$ units.

The linear silyl hydride functionalized polyorganosiloxane has a silicon hydride concentration of 6 mole-percent (mol %) or more while at the same time 45 mol % or less relative to one mole of the linear silyl hydride functionalized polyorganosiloxane. Determine mol % silicon hydride by $^{1}$H, $^{13}$C and $^{29}$Si NMR spectroscopy.

The linear silyl hydride functionalized polyorganosiloxane desirably has a weight-average molecular weight of 350 Da or more, preferably 1,500 Da or more while at the same time typically has a weight-average molecular weight of 60,000 Da or less, preferably 25,000 Da or less.

Suitable linear silyl hydride functionalized polyorganosiloxanes can be prepared according to the procedures in U.S. Pat. No. 3,722,247. Suitable commercial linear silyl hydride functionalized polyorganosiloxanes include that available as 88466 from Momentive Performance Materials Japan LLC.

The concentration of the linear silyl hydride functionalized polyorganosiloxane (Component (B)(i)) is 0.2 wt % or more while at the same time 15 wt % or less based on the weight of the sum of Components (A)(i), (A)(ii), (B)(i) and (B)(iii).

(B)(ii) Resinous Silyl Hydride Functionalized Polyorganosiloxane

The resinous silyl hydride functionalized polyorganosiloxane is necessary to achieve the desired final modulus upon curing the composition of the present invention.

The resinous silyl hydride functionalized polyorganosiloxane has the following formula:

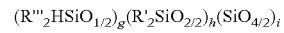

R' is independently in each occurrence selected from a group consisting of phenyl, alkoxy, and $C_{1-8}$ alkyl groups;

R''' is independently in each occurrence selected from a group consisting of hydrogen and $C_{1-8}$ alkyl groups and is preferably selected from hydrogen and methyl groups.

Subscript g is the average mole-ratio of the $(R_2HSiO_{1/2})$ unit relative to all siloxane units in the resinous silyl hydride functionalized polyorganosiloxane. Subscript g has a value of 0.5 or more while at the same time 0.7 or less.

Subscript h is the average mole-ratio of the $(R'_2SiO_{2/2})$ unit relative to all siloxane units in the resinous silyl hydride functionalized polyorganosiloxane. Subscript g has a value of 0.2 or more while at the same time 0.03 or less.

Subscript i is the average mole-ratio of the $(SiO_{4/2})$ unit relative to all siloxane units in the resinous silyl hydride functionalized polyorganosiloxane. Subscript g has a value of 0.27 or more while at the same time 0.51 or less.

Desirably, the resinous silyl hydride functionalize polyorganosiloxane has a weight-average molecular weight of 500 Da or more while at the same time 1500 Da or less.

Suitable resinous silyl hydride functionalized polyorganosiloxanes can be made according to the methods of U.S. Pat. No. 4,774,310. Suitable commercially available resinous silyl hydride functionalized polyorganosiloxanes include those available under the tradename MQH-9 from Milliken.

The resinous silyl hydride functionalized polyorganosiloxane has a silicon hydride concentration in a range of 50 to 75 mole-percent relative to moles of resinous silyl hydride functionalized polyorganosiloxane.

The concentration of the resinous silyl hydride functionalized polyorganosiloxane (Component (B)(ii)) is 1.0 wt % or more while at the same time is 10 wt % or less based on the weight of the sum of Components (A)(i), (A)(ii), (B)(i) and (B)(iii).

In the formulas above for Components (A)(i), (A)(ii), (B)(i) and (B)(ii), it is desirable for R to be independently in each occurrence selected from a group consisting of methyl, vinyl, and phenyl groups; at the same time or alternatively, for R' to be independently in each occurrence selected from a group consisting of methyl and phenyl groups; at the same time or alternatively, for R" to be methyl; and at the same time or alternatively, for R''' to be independently in each occurrence selected from a group consisting of hydrogen and methyl.

Component (C)—Hydrosilylation Catalyst

The composition of the present invention further comprises a hydrosilylation catalyst (Component C). The hydrosilylation catalyst is desirably present in the composition at a concentration of 2 weight-parts per million (ppm) or more and at the same time 6 ppm or less, preferably 4 ppm or less relative to composition weight.

Suitable hydrosilylation catalysts include, without limitation, platinum group metal which includes platinum, rhodium, ruthenium, palladium, osmium, or iridium metal or an organometallic compound thereof and any combination of any two or more thereof. The hydrosilylation catalyst can be platinum compounds and complexes such as platinum (0)-1,3-divinyl-1,1,3,3-tetramethyldisiloxane (Karstedt's catalyst), $H_2PtCl_6$, di-μ-carbonyl di-π-cyclopentadienyldinickel, platinum-carbonyl complexes, platinum-divinyltetramethyldisiloxane complexes, platinum cyclovinylmethylsiloxane complexes, platinum acetylacetonate (acac), platinum black, platinum compounds such as chloroplatinic acid, chloroplatinic acid hexahydrate, a reaction product of chloroplatinic acid and a monohydric alcohol, platinum bis(ethylacetoacetate), platinum bis(acetylacetonate), platinum dichloride, and complexes of the platinum compounds with olefins or low molecular weight organopolysiloxanes or platinum compounds microencapsulated in a matrix or core-shell type structure. The hydrosilylation catalyst can be part of a solution that includes complexes of platinum with low molecular weight organopolysiloxanes that include 1,3-diethenyl-1,1,3,3-tetramethyldisiloxane complexes with platinum. These complexes may be microencapsulated in a resin matrix. The catalyst can be 1,3-diethenyl-1,1,3,3-tetramethyldisiloxane complex with platinum. Suitable hydrosilylation catalysts include those described in, for example, U.S. Pat. Nos. 3,159,601; 3,220,972; 3,296,291; 3,419,593; 3,516,946; 3,814,730; 3,989,668; 4,784,879; 5,036,117; and 5,175,325 and EP 0 347 895 B. Microencapsulated hydrosilylation catalysts and methods of preparing them are exemplified in U.S. Pat. Nos. 4,766,176; and 5,017,654.

Component (D)—Acetylenic Alcohol

The composition of the present invention can optionally further comprise one or a combination or more than one acetylenic alcohol. Acetylenic alcohol can be a desirable component in the composition as a crosslinking inhibitor to provide shelf stability to the composition.

Examples of suitable acetylenic alcohols include any one or any combination of more than one selected from a group consisting of 2-methyl-3-butyn-2-ol; 3,5-dimethyl-1-hexyn-3-ol; 1-ethynyl-1-cyclohexanol; and phenylbutynol.

The concentration of acetylenic alcohol is typically 10 wt % or less, 9 wt % or less, 8 wt % or less, 7 wt % or less, 6 wt % or less, 5 wt % or less, 4 wt % or less, 3 wt % or less, 2 wt % or less, one wt % or less, or even 0.5 wt % or less while at the same time is zero wt % or more and can be 0.001 wt % or more, 0.01 wt % or more, even 0.1 wt % or more based on composition weight. Determine wt % acetylenic alcohol preferably by how much is added in preparing the composition.

Additional Components

The composition of the present invention can comprise or be free of components in addition to those already mentioned. Suitable such additional components can include any one or any combination of more than one selected from a group consisting of mold release agents, filler, adhesion promoters, heat stabilizers, flame retardants, reactive diluents, and oxidation inhibitors. The composition can contain or be free of silica particles.

Preparing the Composition

Preferably, prepare compositions of the present invention by preparing the blend of alkenyl functionalized polyorganosiloxanes (Component A) and the blend of the silyl hydride functional polyorganosiloxanes (Component B) and then combining those blends together with other components to form the composition.

It is beneficial to prepare the blend of alkenyl functionalized polyorganosiloxanes (Component A) by introducing the resinous alkenyl functionalized polyorganosiloxane as a solution in a solvent, such as xylene, and then stripping the solvent from the blend. Introducing the resin as a solid, such as in flake form, in an effort to prepare Component A makes it difficult to prepare a homogenous blend suitable to achieve the performance described herein.

Curing the Composition

Cure compositions of the present invention by exposing the composition to a temperature for a period of time sufficient to accomplish cure. While cure can occur at a temperature as low as 25° C., it generally would require an undesirable long time to complete curing at 25° C. Typically, it is desirable to heat the composition to a temperature of 120° C. or more, preferably 130° C. or more, 140° C. or more, 150° C. or more, while at the same time a temperature that is generally 220° C. or less, 210° C. or less, 200° C. or less, 190° C. or less, 180° C. or less, even 170° C. or less in order to more rapidly cure the composition. For example, evaluation of T90 requires heating the composition to 150° C. and as FIG. 1 illustrates, composition strength nearly levels off (an indication of complete reaction) within 10 minutes.

Suitable methods of mixing components of the present invention to form a composition include adding the component together and agitating with a spatula, a drum roller, a mechanical stirrer, a three-roll mill, a sigma blade mixer, a bread dough mixer or a two-roll mill.

Suitable methods for heating the composition to accelerate curing include heating in any manner including heating through processes such as injection molding, encapsulation molding, press molding, dispenser molding, extrusion molding, transfer molding, press vulcanization, centrifugal casting, calendaring, bead application or blow molding.

The composition of the present invention offers a means to decrease T90 while maintaining or increasing strength of the fully cured composition without having to increase catalyst or crosslinker concentration. As a result, clarity and colorless aspects of the resulting cured composition can remain high. The present composition can cure with reduced T90 and same or higher final modulus while still achieving a clear and/or colorless cured composition.

Evaluate relative T90 values to compositions having the same molar ratio of SiH to terminal alkenyl functionality. Decreased T90 values obtained by the present composition are evident relative to compositions having the same SiH to terminal alkenyl functionality molar ratio and the same hydrosilylation catalyst concentration.

The low T90 and high final modulus the composition of the present invention provides makes it ideal for injection molding applications. The low T90 and high final modulus allows parts to be released from the mold quicker than compositions having higher T90 values without experiences damage to the part because it is still malleable and curing. The rapid cure and high final modulus also makes the compositions of the present invention useful as coatings sealants, adhesives, mold making, encapsulants, lenses, and lightguides

EXAMPLES

Table 1 lists the materials for the Examples (Exs) and Comparative Examples (Comp Exs). "Me" refers to "methyl", "Vi" refers to "vinyl".

Prepare formulations according to the recipes in the tables below. In general, prepare the formulations by combining the A2 component with the A1 component in solvent (xylene) and then stripping the solvent using a rotary evaporator at 1.3 megapascals (10 Torr) and 160° C. for one hour. The solvent should be less than 0.3 wt % of the mixture as confirmed by non-volatile content (NVC) testing (Conduct NVC testing by dispensing 10 g of the mixture onto an aluminum tray, measuring the total weight with a digital scale, heating the sample at 150° C. for 2 hours and then reweighing the sample to measure mass loss). After removal of solvent, add the mixture of the A1 and A2 components to a mixing cup (FlackTec Max 100, clear) at the loading required for the recipe. Add in sequential order the Component C, Component D, Component B1 and then Component B2, with hand mixing after addition of each component using a metal spatula or glass stir rod. Following addition of all components, cap the mixing cup with a screw top lid and mix by asymmetric centrifugal mixing using a FlackTek SpeedMixer DAC 150.1 FVZ at 3,000 revolutions per minute for 25 seconds.

Evaluate optical properties of the formulations in the following manner. Pour a sample of the formulation into a polystyrene cuvette of dimensions 3.2 centimeters by 2 centimeters by 5 centimeters (Konica Minolta, Sensing Plastic Cell CM-A132 Part No. 1870-717). Cure the sample in an oven at 80° C. for 24 hours. Remove the cured sample

TABLE 1

| Component | Description |
|---|---|
| A1-1 | Linear alkenyl functionalized polyorganosiloxane with a molecular formula of: $(Me_2ViSiO_{1/2})_{0.004}(Me_2SiO_{2/2})_{0.996}$. 61000 Daltons weight-average molecular weight; 0.0048 mol % vinyl. Commercially available as "DMS-V41" from Gelest. |
| A1-2 | Linear alkenyl functionalized polyorganosiloxane with a molecular formula of: $(Me_2ViSiO_{1/2})_{0.004}(Me_2SiO_{2/2})_{0.996}$. 102000 weight-average molecular weight; 0.0033 mol % vinyl. Commercially available as "DMS-V-51" from Gelest. |
| A2-1 | Resinous alkenyl functionalized polyorganosiloxane having the following formula: $(ViMe_2SiO_{1/2})_{0.04}(Me_3SiO_{1/2})_{0.40}(SiO_{4/2})_{0.49}(HO_{1/2})_{0.07}$ having a weight-average molecular weight of 6630 Daltons and a vinyl content of 0.070 mol %. Prepare according to the teachings of US2676182 as a 72 wt % solution in xylenes. |
| A2-2 | Resinous alkenyl functionalized polyorganosiloxane having the following formula: $(ViMe_2SiO_{1/2})_{0.09}(Me_3SiO_{1/2})_{0.42}(SiO_{4/2})_{0.45}(HO_{1/2})_{0.04}$ having a weight-average molecular weight of 3512 Daltons and a vinyl content of 0.115 mol %. Prepare according to the teachings of US2676182 as a 72 wt % solution in xylenes. |
| B1-1 | Linear alkenyl functionalized polyorganosiloxane having the following formula: $(Me_3SiO_{1/2})_{0.02}(Me_2SiO_{2/2})_{0.48}(MeHSiO_{2/2})_{0.50}$ having 0.708 mol % of H and a $D/D^H$ mole ratio of 1. Prepare according to the teachings of US3722247. |
| B1-2 | Linear alkenyl functionalized polyorganosiloxane having the following formula: $(Me_3SiO_{1/2})_{0.14}(Me_2SiO_{2/2})_{0.60}(MeHSiO_{2/2})_{0.26}$ having 0.361 mol % of H and a $D/D^H$ mole ratio of 2.4. Prepare according to the teachings of US3722247. |
| B1-3 | Linear alkenyl functionalized polyorganosiloxane having the following formula: $(Me_3SiO_{1/2})_{0.06}(Me_2SiO_{2/2})_{0.76}(MeHSiO_{2/2})_{0.18}$ having a $D/D^H$ mole ratio of 4.2. Prepare according to the teachings of US3722247. |
| B1-4 | Linear alkenyl functionalized polyorganosiloxane having the following formula: $(Me_3SiO_{1/2})_{0.03}(Me_2SiO_{2/2})_{0.86}(MeHSiO_{2/2})_{0.11}$ having a $D/D^H$ mole ratio of 8. Prepare according to the teachings of US3722247. |
| B1-5 | Linear alkenyl functionalized polyorganosiloxane having the following formula: $(Me_3SiO_{1/2})_{0.01}(Me_2SiO_{2/2})_{0.90}(MeHSiO_{2/2})_{0.09}$ having 0.113 mol % of H and a $D/D^H$ mole ratio of 10.6. Prepare according to the teachings of US3722247. |
| B1-6 | Linear alkenyl functionalized polyorganosiloxane having the following formula: $(Me_3SiO_{1/2})_{0.02}(Me_2SiO_{2/2})_{0.91}(MeHSiO_{2/2})_{0.07}$ having 0.100 mol % of H and a $D/D^H$ mole ratio of 13.1. Prepare according to the teachings of US3722247. |
| B2 | Resinous silyl hydride functionalized polyorganosiloxane having the following formula: $(HMe_2SiO_{1/2})_{0.02}(Me_2SiO_{1/2})_{0.62}(SiO_{4/2})_{0.30}$ having 0.950 mol % H. Prepare according to the teachings of US4774310. |
| C | Karstedt's catalyst: Platinum(0)-1,3-divinyl-1,1,3,3-tetramethyldisiloxane. Commercially available from Sigma-Aldrich. |
| D1 | Inhibitor 1-ethynyl-1-cyclohexanol. Commercially available from Sigma-Aldrich. |
| D2 | Inhibitor 3,5-dimethyl-1-hexyn-3-ol. Commercially available as Surfynol™ 61 (Surfynol is a trademark of Evonik Degussa GmbH). | from the cuvette and post cure at 150° C. for one hour. Measure optical properties of the post-cured sample using a Perkin Elmer Lambda 950 spectrophotometer equipped with a 150 millimeter integrating sphere. Operate the spectrophotometers at a scan speed of 250 nanometers per minute using a one nanometer slit width over a wavelength range of 200-800 nanometers. Obtain optical transmittance of the samples as described in ASTMD1003. Calculate Δu'v' from the transmittance spectra as described in CIE 1976 standard. Report transmittance data with reflection losses (Fresnel reflections).

Data for FIG. 1

Table 1 contains the weight-parts of each component in the formulations for Comparative Example (Comp Ex) A, Comp Ex B and Example (Ex) 1.

TABLE 1

| Component/Characteristic | Comp Ex A | Comp Ex B | Ex 1 |
|---|---|---|---|
| A1-1 (wt parts) | 46.52 | 51.50 | 50.40 |
| A2-1 (wt parts) | 38.06 | 42.10 | 41.23 |
| B1-2 (wt parts) | 15.22 | 0 | 3.27 |
| B2 (wt parts) | 0 | 6.24 | 4.90 |
| C (wt parts) | 0.060 | 0.060 | 0.060 |
| D1 (wt parts) | 0.15 | 0.14 | 0.14 |
| H:Vi molar ratio | 1.8 | 1.8 | 1.8 |
| Catalyst (ppm) | 3 | 3 | 3 |
| $D/D^H$ molar ratio in B1 | 2.4 | 0 | 2.4 |
| T90 (seconds) | 376.9 | 389 | 266.5 |
| Final torque-modulus (dNm) | 8.52 | 57.6 | 57.6 |

FIG. 1 provides in illustration form the strength of the composition as the reaction progresses. The large symbol for each set of data corresponds to the T90 value for the run. As shown in the curves of FIG. 1 and the data of Table 1, when the composition lacks linear silyl hydride functionalized polyorganosiloxane (see Comp Ex B) then the formulation not only has a relatively long T90 but fails to achieve a final strength even close to the other compositions. When the composition lacks a resinous silyl hydride functionalized polyorganosiloxane (see Comp Ex A) then the formulation has a relative long T90 even though it eventually reaches a similar composition strength as Ex 1. Ex 1 illustrates that when both the linear and resinous silyl hydride functionalize polyorganosiloxanes are present the composition quickly builds strength and has a relatively short T90.

Effect of Increasing Catalyst Rather than Adding Linear SiH

Comp Exs C and D illustrate the effect of increasing catalyst concentration to a composition comprising linear and resinous alkenyl functionalized polyorganosiloxanes and resinous silyl hydride functionalized polyorganosiloxanes. Table 2 presents the weight-parts of each component in Comp Exs C and D as well as the characteristics of the resulting compositions. Comp Ex D contains 3 times the amount of catalyst relative to Comp Ex C and results in a higher aged Δu'v', corresponding to a reduction in optical quality.

TABLE 2

| Component/Characteristic | Comp Ex C | Comp Ex D |
|---|---|---|
| A1-2 (wt parts) | 69.63 | 69.63 |
| A2-1 (wt parts) | 27.08 | 27.08 |
| B2 (wt parts) | 3.09 | 3.09 |
| C (wt parts) | 0.060 | 0.060 |

TABLE 2-continued

| Component/Characteristic | Comp Ex C | Comp Ex D |
|---|---|---|
| D2 (wt parts) | 0.1 | 0.1 |
| H:Vi molar ratio | 1.4 | 1.4 |
| Catalyst (ppm) | 3.1 | 9.3 |
| T90 (seconds) | 394.4 | 320.26 |
| Final torque-modulus (deciNewton Meters(dNm)) | 16.98 | 20.08 |
| Initial % Transmittance at 400 nm | 88.30 | 88.35 |
| Initial Δu'v' at 3.2 cm path length | 0.0016 | 0.0016 |
| 150 C 200 hours aged Δu'v' | 0.0069 | 0.0167 |

Effect of Increasing SiH Concentration Rather than Adding Linear SiH

Comp Exs E and F illustrate the effect of increasing resinous silyl hydride functionalized polyorganosiloxane (increasing resinous crosslinker concentration). Table 3 presents the weight-parts of each component in Comp Exs E and F and characteristics of the resulting compositions. Increasing resinous crosslinker results in a decreased initial % transmittance at 400 nm and aged Δu'v', corresponding less transparency.

TABLE 3

| Component/Characteristic | Comp Ex C | Comp Ex D |
|---|---|---|
| A1-1 (wt parts) | 41.86 | 40.8 |
| A1-2 (wt parts) | 13.75 | 13.36 |
| A2-1 (wt parts) | 39.59 | 38.58 |
| B2 (wt parts) | 4.6 | 7.0 |
| C (wt parts) | 0.06 | 0.06 |
| D2 (wt parts) | 0.2 | 0.2 |
| H:Vi molar ratio | 1.4 | 2.2 |
| Catalyst (ppm) | 3.1 | 3.1 |
| Initial % Transmittance at 400 nm | 87.3 | 81.9 |
| Initial Δu'v' at 3.2 cm path length | 0.0018 | 0.0038 |
| 150 C 200 hours aged Δu'v' | 0.0017 | 0.0055 |

Further Demonstrations of the Present Invention

The following data illustrates the beneficial results obtained by compositions of the present invention upon curing the composition. In particular, faster T90 values and equal or greater final modulus values are achieved relative to similar compositions with only resinous silyl-hydride functional crosslinkers over a broad range of silyl hydride-to-alkenyl ratios, demonstrating the surprising effect of adding linear crosslinker has in the present invention. This result is obtained over a broad range of silyl hydride to alkenyl ratios when the wt % of linear silyl hydride functionalized polyorganosiloxane relative to all silyl hydride functionalized polyorganosiloxanes is greater than 10 wt % and less than 50 wt % and the ratio of $D/D^H$ for the silyl hydride functionalized polyorganosiloxane is greater than 2 and less than 14.

Tables 4-6 present formulations and results for samples with a variety of $D/D^H$ ratios at three different silyl hydride to alkenyl ratios, each using A2-1 as the resinous alkenyl functionalized polyorganosiloxane. Formulations show the weight-parts of each component in the composition.

Similarly, Table 7 presents formulations and results for samples with a variety of $D/D^H$ ratios at three different silyl hydride-to-alkenyl ratios, each using A2-2 as the resinous alkenyl functionalized polyorganosiloxane.

Samples identified as Examples (Exs) show decreased T90 value and similar or higher final torque-modulus relative to the reference (formulation without linear crosslinker) over all of the silyl hydride-to-alkenyl ratios—demonstrating the unexpected impact of adding the linear crosslinker over a broad range of silyl hydride-to-alkenyl ratios. While some of the samples marked as Comparative Examples (Comp Exs) demonstrate decreased T90 and similar or higher final torque-modulus relative to the reference in one or some of the silyl hydride-to-alkenyl ratios they do not demonstrate such properties over all silyl hydride to alkenyl ratios.

TABLE 4

Resin A2-1 with SiH:alkenyl molar ratio of 1.2

| Component/ Characteristic | Comp Ex C (Reference) | Ex 2 | Ex 3 | Ex 4 | Ex 5 | Ex 6 | Ex 7 | Ex 8 | Comp Ex D | Comp Ex E | Comp Ex F | Comp Ex G | Comp Ex H |
|---|---|---|---|---|---|---|---|---|---|---|---|---|---|
| A1-1 | 52.55 | 52.26 | 52.22 | 52.14 | 52.05 | 51.97 | 51.65 | 51.33 | 52.23 | 52.40 | 51.30 | 52.34 | 52.33 |
| A2-1 | 42.99 | 42.75 | 42.72 | 42.66 | 42.59 | 42.52 | 42.26 | 41.99 | 42.74 | 42.87 | 41.97 | 42.82 | 42.81 |
| B1-1 | | | | | | | | | 2.42 | | | | |
| B1-2 | | | | 1.25 | | | | | | 0.45 | | | |
| B1-3 | | 0.77 | | | 1.29 | | 2.36 | | | | 3.26 | | |
| B1-4 | | | | | | 1.33 | | | | | | | |
| B1-5 | | | 0.73 | | | | | | | | | 0.46 | |
| B1-6 | | | | | | | | 2.59 | | | | | 0.47 |
| B2 | 4.26 | 4.02 | 4.13 | 3.75 | 3.87 | 3.98 | 3.53 | 3.89 | 2.42 | 4.07 | 3.26 | 4.18 | 4.19 |
| C | 0.060 | 0.060 | 0.060 | 0.060 | 0.060 | 0.060 | 0.060 | 0.060 | 0.060 | 0.060 | 0.060 | 0.060 | 0.060 |
| D1 | 0.14 | 0.14 | 0.14 | 0.14 | 0.14 | 0.14 | 0.14 | 0.14 | 0.14 | 0.14 | 0.14 | 0.14 | 0.14 |
| $D/D^H$ ratio | N/A | 4.2 | 10.6 | 2.4 | 4.2 | 8.0 | 4.2 | 13.1 | 1.0 | 2.4 | 4.2 | 10.6 | 13.1 |
| Wt % B1 relative to sum of B1 and B2 | 0 | 16 | 15 | 25 | 25 | 25 | 40 | 40 | 50 | 10 | 50 | 10 | 10 |
| T90 (s) | 479 | 452 | 461 | 406 | 438 | 448 | 402 | 444 | 416 | 454 | 395 | 472 | 464 |
| Final Torque-Modulus (dNm) | 26.6 | 27.5 | 26.8 | 26.9 | 27.4 | 26.5 | 26.9 | 27.0 | 20.9 | 26.6 | 24.5 | 26.1 | 24.6 |

TABLE 5

Resin A2-1 with SiH:alkenyl molar ratio of 1.7

| Component/ Characteristic | Comp Ex I (Reference) | Ex 9 | Ex 10 | Ex 11 | Ex 12 | Ex 13 | Ex 14 | Ex 15 | Ex 16 | Comp Ex J | Comp Ex K | Comp Ex L | Comp Ex M | Comp Ex N |
|---|---|---|---|---|---|---|---|---|---|---|---|---|---|---|
| A1-1 | 51.63 | 51.23 | 51.12 | 51.07 | 50.96 | 50.83 | 50.79 | 50.40 | 49.97 | 51.56 | 51.34 | 49.94 | 49.48 | 49.32 |
| A2-1 | 42.25 | 41.92 | 41.87 | 41.78 | 41.69 | 41.59 | 41.56 | 41.24 | 40.88 | 42.18 | 42.01 | 40.86 | 40.48 | 40.35 |
| B1-1 | | | | | | | | | | 0.61 | | | | |
| B1-2 | | | | 1.74 | | | | | | | | | | |
| B1-3 | | 1.06 | | | 1.79 | | | 3.26 | | | | 4.5 | | |
| B1-4 | | | | | | 1.84 | | | | | 0.64 | | 4.92 | |
| B1-5 | | | 1.01 | | | | 1.86 | | | | | | | 5.07 |
| B1-6 | | | | | | | | | 3.58 | | | | | |
| B2 | 5.92 | 5.59 | 5.73 | 5.21 | 5.36 | 5.53 | 5.59 | 4.89 | 5.37 | 5.45 | 5.80 | 4.50 | 4.92 | 5.07 |
| C | 0.60 | 0.60 | 0.60 | 0.60 | 0.60 | 0.60 | 0.60 | 0.60 | 0.60 | 0.60 | 0.60 | 0.60 | 0.60 | 0.60 |
| D1 | 0.14 | 0.14 | 0.14 | 0.14 | 0.14 | 0.14 | 0.14 | 0.14 | 0.14 | 0.14 | 0.14 | 0.14 | 0.14 | 0.14 |
| $D/D^H$ ratio | N/A | 4.2 | 10.6 | 2.4 | 4.2 | 8.0 | 10.6 | 4.2 | 13.1 | 1.0 | 8.0 | 4.2 | 8.0 | 10.6 |
| Wt % B1 relative to sum of B1 and B2 | 0 | 16 | 15 | 25 | 25 | 25 | 25 | 40 | 40 | 10 | 10 | 50 | 50 | 50 |
| T90 (s) | 434 | 368 | 402 | 313 | 351 | 360 | 367 | 319 | 365 | 431 | 375 | 314 | 320 | 333 |
| Final Torque-Modulus (dNm) | 53.0 | 56.8 | 54.8 | 58.3 | 58.8 | 56.9 | 56.3 | 54.9 | 53.5 | 52.7 | 59.0 | 51.1 | 53.6 | 54.8 |

TABLE 6

Resin A2-1 with SiH:alkenyl molar ratio of 2.2

| Component/ Characteristic | Comp Ex O (Reference) | Ex 17 | Ex 18 | Ex 19 | Ex 20 | Ex 21 | Ex 22 | Ex 23 | Comp Ex P | Comp Ex Q | Comp Ex R | Comp Ex S | Comp Ex T | Comp Ex U |
|---|---|---|---|---|---|---|---|---|---|---|---|---|---|---|
| A1-1 | 50.75 | 50.24 | 50.17 | 50.50 | 50.05 | 49.73 | 49.21 | 48.67 | 50.65 | 50.45 | 50.38 | 50.37 | 49.06 | 48.63 |
| A2-1 | 41.53 | 41.11 | 41.05 | 41.31 | 40.95 | 40.69 | 40.27 | 39.82 | 41.44 | 41.28 | 41.22 | 41.22 | 40.14 | 39.79 |
| B1-1 | | | | 2.00 | | | | | | 0.77 | | | | |
| B1-2 | | | | | 2.20 | | | | | | | | 5.30 | |
| B1-3 | | 1.35 | | | | | 4.13 | | | | 0.81 | | | 5.69 |
| B1-4 | | | | | | 2.35 | | | | | | | | |

TABLE 6-continued

Resin A2-1 with SiH:alkenyl molar ratio of 2.2

| Component/Characteristic | Comp Ex O (Reference) | Ex 17 | Ex 18 | Ex 19 | Ex 20 | Ex 21 | Ex 22 | Ex 23 | Comp Ex P | Comp Ex Q | Comp Ex R | Comp Ex S | Comp Ex T | Comp Ex U |
|---|---|---|---|---|---|---|---|---|---|---|---|---|---|---|
| B1-5 | | | 1.29 | | | | | | | | | 0.82 | | |
| B1-6 | | | | | | | | 4.52 | | | | | 0.82 | |
| B2 | 7.52 | 7.09 | 7.30 | 5.99 | 6.61 | 7.03 | 6.19 | 6.79 | 6.94 | 7.27 | 7.38 | 7.38 | 5.30 | 5.69 |
| C | 0.60 | 0.60 | 0.60 | 0.60 | 0.60 | 0.60 | 0.60 | 0.60 | 0.60 | 0.60 | 0.60 | 0.60 | 0.60 | 0.60 |
| D1 | 0.14 | 0.14 | 0.14 | 0.14 | 0.14 | 0.14 | 0.14 | 0.14 | 0.14 | 0.14 | 0.14 | 0.14 | 0.14 | 0.14 |
| $D/D^H$ ratio | N/A | 4.2 | 10.6 | 1 | 2.4 | 8.0 | 4.2 | 13.1 | 1.0 | 4.2 | 10.6 | 13.1 | 2.4 | 4.2 |
| Wt % B1 relative to sum of B1 and B2 | 0 | 16 | 15 | 25 | 25 | 25 | 40 | 40 | 10 | 10 | 10 | 10 | 50 | 50 |
| T90 (s) | 375 | 265 | 288 | 307 | 234 | 240 | 238 | 263 | 357 | 289 | 296 | 296 | 189 | 220 |
| Final Torque-Modulus (dNm) | 59.0 | 66.6 | 64.2 | 65.8 | 64.0 | 65.1 | 63.7 | 60.7 | 64.9 | 67.4 | 64.7 | 66.3 | 53.0 | 59.6 |

TABLE 7

Resin A2-2 at various SiH:alkenyl molar ratios

| | 1.2 SiH:Alkenyl Ratio | | | 1.6 SiH:Alkenyl Ratio | | | | 1.8 SiH:Alkenyl Ratio | | | |
|---|---|---|---|---|---|---|---|---|---|---|---|
| Component/Characteristic | Comp Ex V (Reference) | Ex 24 | Comp Ex W | Comp Ex X (Reference) | Ex 25 | Comp Ex Y | Comp Ex Z | Comp Ex AA (Reference) | Comp Ex AA | Comp Ex AA | Comp Ex AA |
| A1-2 | 46.35 | 45.29 | 46.14 | 45.28 | 43.92 | 43.82 | 45.01 | 44.76 | 44.46 | 43.28 | 42.38 |
| A2-2 | 46.35 | 45.29 | 46.14 | 45.28 | 43.92 | 43.82 | 45.01 | 44.76 | 44.46 | 43.28 | 42.38 |
| B1-2 | | 0.75 | 3.69 | | 4.79 | | 0.98 | | 1.09 | 8.3 | |
| B1-5 | | | | | 3.65 | | | | | | 6.02 |
| B2 | 7.09 | 5.53 | 6.76 | 9.25 | 7.18 | 8.52 | 8.80 | 10.28 | 9.79 | 7.95 | 9.02 |
| C | 0.06 | 0.060 | 0.060 | 0.060 | 0.060 | 0.060 | 0.060 | 0.060 | 0.060 | 0.060 | 0.060 |
| D1 | 0.14 | 0.14 | 0.14 | 0.14 | 0.14 | 0.14 | 0.14 | 0.14 | 0.14 | 0.14 | 0.14 |
| $D/D^H$ ratio | N/A | 2.4 | 2.4 | N/A | 2.4 | 10.6 | 2.4 | N/A | 2.4 | 2.4 | 10.6 |
| Wt % B1 relative to sum of B1 and B2 | 0 | 40 | 10 | 0 | 40 | 30 | 10 | 0 | 10 | 40 | 40 |
| T90 (s) | 462 | 388 | 441 | 319 | 244 | 385 | 233 | 94 | 69 | 210 | 139 |
| Final Torque-Modulus (dNm) | 50.0 | 51.4 | 53.3 | 84.0 | 90.1 | 73.7 | 86.5 | 80.3 | 84.2 | 96.9 | 82.5 |

What is claimed is:

1. A composition comprising:

(A) a blend of alkenyl functionalized polyorganosiloxanes, the blend consisting of:

(i) a linear alkenyl functionalized polyorganosiloxane having the following formula:

$$(R_3SiO_{1/2})_{1-a}(R'_2SiO_{2/2})_a$$

where: at least one R in each $(R_3SiO_{1/2})$ unit is selected from $C_{2-8}$ terminal alkenyl groups; subscript a has a value in a range of 0.333 to 0.999; and wherein the linear alkenyl functionalized polyorganosiloxane has a weight-average molecular weight of 260-155,000 Daltons as determined by gel permeation chromatography; and (ii) a resinous alkenyl functionalized polyorganosiloxane having the following formula:

$$(R_3SiO_{1/2})_b(SiO_{4/2})_c(HO_{1/2})_d$$

where: at least two R groups in each molecule are selected from $C_{2-8}$ terminal alkenyl groups; subscript b has a value in a range of 0.35-0.55; subscript c has a value in a range of 0.46-0.55;

subscript d has a value in a range of 0.04 to 0.11; where the sum of subscripts b, c and d is one; the weight-average molecular weight of the resinous alkenyl functionalized polyorganosiloxane is in a range of 3,000 to 30,000 Daltons as determined by GPC;

where the total concentration of $C_{2-8}$ terminal alkenyl groups in the blend of alkenyl functionalized polyorganosiloxanes is in a range of 2.5 to 13.5 mole-percent relative to total moles of polyorganosiloxanes in the blend of alkenyl functionalized polyorganosiloxanes; and (B) a blend of silyl hydride functionalized polyorganosiloxanes, the blend consisting of:

(i) a linear silyl hydride functionalized polyorganosiloxane having the following formula:

$$(R'_3SiO_{1/2})_{1-(e+f)}(R'_2SiO_{2/2})_e(R''HSiO_{2/2})_f$$

where: the sum of subscripts e and f is in a range of 0.50 to 0.999; the ratio of subscripts e/f is greater than 2.0 and less than 14.0; wherein the linear silyl hydride functionalized polyorganosiloxane has a silicon hydride concentration in a range of 6 to 45 mole-percent relative to moles of the linear silyl hydride functionalized polyorganosiloxane; and a weight-average molecular weight in a range of 350 to 60,000 Daltons as determined by GPC, and is present at a concentration of more than 10 weight-percent and less than 50 weight-percent of weight of the blend of silyl hydride functionalized polyorganosiloxanes; and (ii) a resinous silyl hydride functionalized polyorganosiloxane having the following formula:

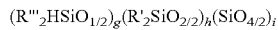

$(R'''_2HSiO_{1/2})_g(R'_2SiO_{2/2})_h(SiO_{4/2})_i$ where: subscript g has a value in a range of 0.5 to 0.7; subscript h has a value in a range of 0.01 to 0.03; subscript i has a value in a range of 0.27 to 0.51 where the sum of subscripts g, h and i is one; wherein the resinous silyl hydride functionalized polyorganosiloxane has a silicon hydride concentration in a range of 50 to 75 mole-percent relative to moles of resinous silyl hydride functionalized polyorganosiloxane; and having a weight-average molecular weight in a range of 500 to 1,500 Daltons as determined by GPC; and (C) a hydrosilylation catalyst at a concentration of 2 to 6 weight-parts per million weight parts of the composition;

wherein:

R is independently in each occurrence selected from a group consisting of phenyl, hydroxyl, $C_{1-8}$ alkyl, and $C_{2-8}$ terminal alkenyl groups;

R' is independently in each occurrence selected from a group consisting of phenyl and $C_{1-8}$ alkyl groups;

R" and R"' independently in each occurrence selected from a group consisting of hydrogen and $C_{1-8}$ alkyl groups;

subscripts a-i are mole-ratios for the corresponding siloxane units relative to total siloxane units in the molecule; and the concentration of Component (A)(i) is in a range of 25 to 80 weight-percent; Component (A)(ii) is in a range of 25 to 70 weight-percent; Component (B)(i) is in a range of 0.2 to 15 weight-percent; and Component (B)(ii) is in a range of 1.0 to 10 weight-percent; with weight-percent relative to combined weight of Components (A)(i), (A)(ii), (B)(i) and (B)(ii); and the molar ratio of silyl hydride hydrogens to the sum of terminal alkenyl functionality on alkenyl functionalized polyorganosiloxane in the composition is in a range of 1.2 to 2.2.

2. The composition of claim 1, wherein the resinous alkenyl functionalized polyorganosiloxane of (A)(ii) is selected from a group consisting of alkenyl functionalized polyorganosiloxanes where subscript b is in a range of 0.35 to 0.47 and alkenyl functionalized polyorganosiloxanes where subscript b is in a range of 0.48 to 0.55.

3. The composition of claim 1, wherein the composition further comprises 0.1 to 1.0 weight-percent of acetylenic alcohol based on composition weight.

4. The composition of claim 1, wherein the concentration of hydrosilylation catalyst is in a range of 2 to 4 weight-parts per million weight parts of the composition.

5. The composition of claim 1, wherein the terminal alkenyl groups are vinyl groups.

6. The composition of claim 1, wherein each is R independently in each occurrence selected from a group consisting of methyl, vinyl, and phenyl groups; R' is independently in each occurrence selected from a group consisting of methyl and phenyl groups; R" is methyl; and R"' is independently in each occurrence selected from a group consisting of hydrogen and methyl groups.

7. The composition of claim 1, wherein the molar ratio of silyl hydride hydrogens to the sum of terminal alkenyl and hydroxyl groups in the composition is in a range of 1.2 to 1.7.

8. The composition of claim 1, wherein the composition is free of silica particles.

9. A method for curing the composition of claim 1, the method comprising the steps: (i) providing the composition; and (ii) heating the composition to a temperature in a range of 120 to 220 degrees Celsius.

10. The method of claim 9, wherein the heating of the composition occurs during a process selected from a group consisting of: injection molding processes, encapsulation molding processes, press molding processes, dispenser molding processes, extrusion molding processes, transfer molding processes, transfer molding processes, press vulcanization processes, centrifugal casting processes, calendaring processes, bead application processes and blow molding processes.

* * * * *